March 5, 1963  R. L. VICK  3,079,757
COMBINATION HYDRAULIC POWER VALVE AND MASTER CYLINDER
Original Filed Jan. 11, 1960
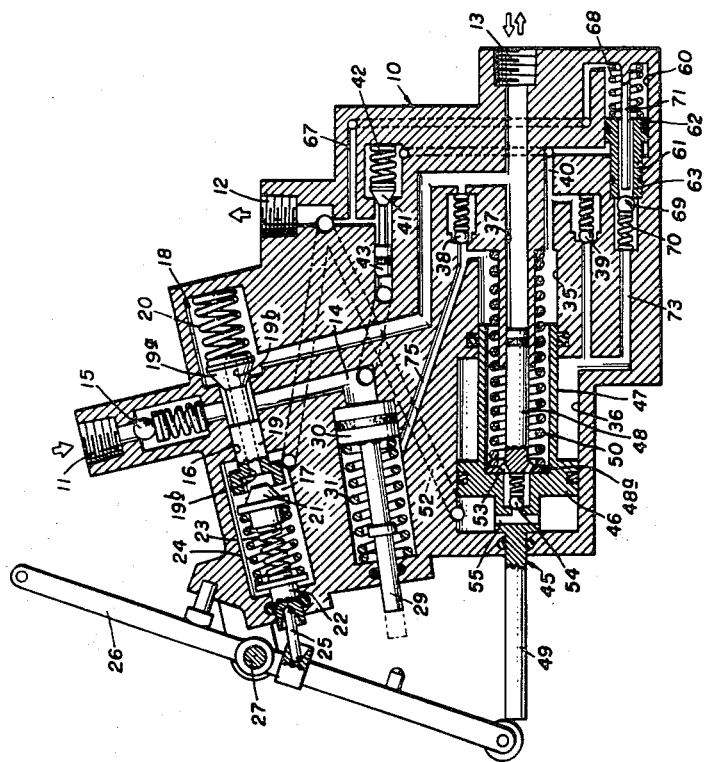

United States Patent Office 3,079,757
Patented Mar. 5, 1963

3,079,757
COMBINATION HYDRAULIC POWER VALVE
AND MASTER CYLINDER
Ralph L. Vick, Granada Hills, Calif., assignor to The
Bendix Corporation, a corporation of Delaware
Original application Jan. 11, 1960, Ser. No. 1,721, now
Patent No. 3,034,301, dated May 15, 1962. Divided
and this application Jan. 13, 1961, Ser. No. 89,598
6 Claims. (Cl. 60—54.6)

This invention relates to hydraulic devices of the type commonly used to deliver fluid at controlled pressure to hydraulic motors, such as the wheel cylinders of a hydraulic brake system. The invention is useful in devices which normally control the application (at reduced pressure) of fluid from a power pump or other high pressure source, but are also capable of pumping to develop the necessary pressure when the power source fails. The invention also has application to pumping devices (commonly referred to as master cylinders) alone. This application is a division of Serial No. 1,721, filed January 11, 1960, now Patent No. 3,034,301.

An object of the invention is to improve the "feel" of a hydraulic brake system, whether the brake pedal merely actuates a valve, as in a power system, a valve and a master cylinder in a combined power and manual system, or a compound master cylinder in a manual system.

Another object is to provide an effective and simple apparatus for limiting the braking pressure under power operation of a combined power and manual system.

Another object is to provide a compound master cylinder having good "feel" and good brake pressure control characteristics, which cylinder can be "pumped" to charge the system.

Other more specific objects and features of the invention will appear from the description to follow.

As to the first-mentioned object, it is generally desirable in any hydraulic brake system that the pressure applied to the brakes be always proportional to the force applied to the pedal. This is inherent in a simple master cylinder, but not necessarily in a power valve or in a compound master cylinder.

Power valves customarily employ a reaction piston as a part of the movable element of the valve, but this reaction piston is of small area, and the mechanical coupling between it and the pedal is often such that the reaction force felt at the pedal is less than is to be desired. In accordance with the present invention, any desired reaction force is obtained by providing a reaction piston separate from the power valve and having a longer stroke and coupled to the pedal to have greater movement than the valve.

In compound master cylinders, a large area pump piston supplies a large volume of fluid until the brakes are charged, whereupon the large pump is cut out and further pressure rise in the brake line reacts only on a smaller, secondary pump piston. The reaction force therefore changes suddenly as the primary piston is cut out of action. The present invention provides a special pressure-actuated valve, responsive to both the primary and secondary pump pressures, that increasingly bypasses fluid from the primary cylinder to return as the brake pressure increases, and gradually reduces the reaction force on the primary piston to a low value. By unloading the primary piston completely at high pedal forces, all the pedal force is effective on the secondary piston.

As to the second object, it is old in combined power and manual systems to limit the brake pressure obtainable by power operation by limiting the travel of the power valve actuating member by means of a movable stop. The stop is normally retracted by a spring to permit full pedal travel with corresponding excessive travel of the power valve actuating element. However, when power pressure is available, this pressure is applied to a piston associated with the stop to move the stop into a second position (against the force of the spring) in which it limits the pedal travel to such lesser value as provides the maximum brake pressure that is desired. A defect of this prior system is that reduced power pressure insufficient to provide the highest brake pressure desired may eject the stop and limit the pedal travel despite the face that manual operation is necessary to produce the desired pressure, and actuation of the master cylinder through its maximum stroke is prevented by the stop. In accordance with the present invention, this defect of prior systems is eliminated by applying pressure from the master cylinder to the other side of the stop-actuating piston in opposition to the pressure of the power supply. As a result, whenever master cylinder operation is necessary to develop the desired brake pressure, the stop is always automatically shifted into full stroke position despite the fact that there may be sufficient pressure from the power supply to overcome the spring.

As to the third object, under adverse or emergency conditions when a large volume of fluid is required to charge a brake system, that is, move the brake shoes into contact with the drums, even a compound master cylinder may not supply the necessary fluid on one stroke, and it is desirable to be able to "pump" the system by rapidly partially retracting and again depressing the pedal. If such pumping is to be effective, check valves must be provided to prevent return of fluid from the brakes into the cylinders during the return stroke of the master pistons. However, such check valves are objectionable in ordinary valves, because they prevent close control of the braking force from a high to a lower value. If the operator overbrakes, he must retract the pedal sufficiently to release fluid through the power valve. However, because of the greater volume of fluid displaced by the special reaction piston of the present invention, the operator has greater ability to correct overbraking, by partial retraction of the pedal, without valving fluid from the brake line.

A full understanding of the invention may be had from the following detailed description with reference to the drawing.

The single FIGURE of the drawing is a schematic diagram of a combination hydraulic power valve and master cylinder incorporating the invention.

Referring to the drawing, a body 10 has a power pressure inlet port 11 for connection to a source of pressure fluid, a return port 12 for connection to a low-pressure reservoir, and a delivery port 13 for connection to a brake line. The inlet port 11 is connected to a power pressure passage 14 by a check valve 15 which prevents return flow from the pressure passage through the inlet port.

The body defines a power valve cylinder 16 opening into a return chamber 17 at its left end and into a delivery chamber 18 at its right end. The pressure passage 14 communicates with the valve cylinder 16 intermediate its ends. A valve piston 19 is positioned within the valve cylinder 16 and seals therewith at its left end and has a poppet 19a on its right end that seats against the right end of the valve cylinder 16 when in closed position, in which it is normally retained by a helical compression spring 20 compressed between the right end of the valve piston and the end of the chamber 18. The piston 19 has a passage 19b extending therethrough, the left end of the passage being adapted to be closed by a poppet 21 which is normally displaced from the left end of the piston 19 but is adapted to be urged thereagainst by an actuator 22 which extends from the passage 17 to the exterior of the body, the actuator 22 being yieldably coupled to the poppet 21 by helical compression spring 23 and 24. The outer end of the actuator 22 is coupled by a link 25 to an actuating lever 26 which is fulcrumed on the body 10 by a pin 27. The upper end of the lever 26 is adapted to be connected by any suitable linkage to a brake pedal or other manually actuated device not shown.

Rocking movement of the upper end of the lever 26 to the left rocks the actuator 22 to the right to first engage the poppet 21 against the left end of the piston 19 to disconnect the return passage from the passage 19b in the piston 19. Further movement of the actuator 22 shifts the valve piston 19 to the right to disengage the poppet 19a from the right end of the valve cylinder and permit pressure fluid in the passage 14 to flow into the delivery chamber 18 and thence to the delivery port 13.

A stop 29, consisting of the extended end of the piston rod of a piston 30, limits the rocking movement of the lever 26 in brake-applying direction. The piston 30 is normally maintained in rightmost position by a helical compression spring 31, but when power pressure is existent in the passage 14, this pressure is applied to the right end of the piston 30 and shifts the stop 29 into the dotted line position to limit the lever movement to a lesser amount.

The body 10 defines in its lower portion a master cylinder consisting of a small cylinder 35 which opens at its left end into a large cylinder 36. A reaction cylinder 37 smaller than the cylinder 35 is positioned therewithin, and is connected at its right end directly to the delivery port 13. The cylinder 35 is connected at its right end by a check valve 38 to the delivery port 13, and the large cylinder 36 is connected by a check valve 39 and a passage 40 to the right end of the small cylinder 35. Passage 40 is adapted to be connected to the return port 12 by a poppet 41. The poppet 41 is normally urged against its seat by a spring 42, but opens in response to sufficient pressure in the passage 14 acting on a piston 43 connected to the poppet 41.

A master piston assembly 45 is provided consisting of a large piston 46 in the large cylinder 36, a small piston 47 in the large cylinder 36, a small piston 47 in the small cylinder 35, and a reaction piston 48 in the reaction cylinder 37. The assembly has an actuating rod 49 projecting exterior of the body 10 and adapted to be shifted rightward by the lower end of the lever 26. The piston assembly 45 is normally urged into its leftmost position by a helical compression spring 50. The reaction piston 48 has a head 48a which is held against the piston 46 by the spring 50. The left end of the large cylinder 36 is communicated with the return passage 12 by a passage 52, and the left end of the interior of the small piston 47 is communicated through passages 53 in the reaction piston head 48a and a check valve 54 and passages 55 with the left end of the cylinder 36.

The body 10 further defines in the lower right-hand portion a stepped cylinder consisting of a large cylinder 60 and a small cylinder 61 containing a stepped piston assembly consisting of a large piston 62 in the cylinder 60 and a small piston 63 in the cylinder 61. The right end of the large cylinder 60 is connected to the return port 12 by a passage 67 and contains a helical compression spring 68 for normally urging the stepped piston to the left. The stepped piston has a passage extending therethrough against the left end of which a check valve 69 is urged by a helical compression spring 70. A stop rod 71 projects through the passage in the stepped piston for limiting rightward movement of the check valve 69. The left end of the small cylinder 61 is connected by a passage 73 to the right end of the large master cylinder 36. The right end of the small master cylinder 35 is connected by a passage 75 to the left side of the piston 30, which actuates the stop 29.

The structure described functions as a power valve when there is sufficient pressure existing in the pressure inlet port 11 and functions as a master cylinder when the pressure in inlet port 11 is insufficient to supply the desired brake pressure.

When there is sufficient pressure existing in the pressure inlet port 11 to provide full power operation, the device functions as follows: The high pressure in the inlet port 11 is applied past the check valve 15 to the passage 14, which communicates with the midportion of the valve cylinder 16, and is applied against the stop piston 30 and the valve piston 43. This pressure urges the stop piston 30 to the left, extending the stop 29 to the dotted line position to limit the stroke of the lever 26. The same pressure applied to the piston 43 opens the poppet valve 41 communicating the passage 40 with the return port 12. This vents the right end of the large master cylinder 36 past the check valve 39 to the return port. The small master cylinder 35 is vented directly to the passage 40. Therefore, movement of the master cylinder pistons 47 and 46 to the right is opposed only by the small return pressure which is balanced by the return pressure in the left end of cylinder 36 except to the extent of the area of piston rod 9, which is made small to keep the unbalanced force small. The stepped piston 62, 63 remains in its left position, since it has applied to it only the return pressure.

Under the conditions described, when the lever 26 is rocked counterclockwise, the actuator 22 advances the poppet 21 into engagement with the left end of the valve piston 19, cutting off the passage 19b in the valve piston from the return passage, and further movement advances the valve piston 19 to open the poppet 19a off its seat and admit pressure fluid from the passage 14 into the delivery chamber 18 and thence to the delivery port 13, causing the pressure in the delivery port to rise. This delivery pressure is always applied to the right end of the reaction piston 48, developing a reaction force proportional to the pressure which is applied by the piston rod 49 to the lower end of the actuating lever 26. Since this reaction force is applied to the lever 26 at a point thereon substantially spaced from the fulcrum 27, the reaction force felt by the operator is substantial and gives him a good "feel" of the force applied. It is to be noted that a reaction force is also applied to the right end of the valve piston 19 since it is also exposed to the delivery pressure. However, it is desirable to make the valve piston 19 relatively small in area, and because of this fact, plus the fact that the actuator 22 is coupled to the actuating lever 26 very close to its fulcrum, the reaction force applied to the lever 26 by the piston 19 is relatively small and insufficient to give a satisfactory "feel."

During power operation, the reaction force on the right end of the valve piston 19 compresses the springs 23 and 24 between the actuator 22 and the poppet 21 to an extent proportional to the brake or delivery pressure, and the lever 26 must be rocked farther to compensate for the compression of springs 23 and 24 and open the poppet 19a. The delivery pressure obtained is therefore proportional to the movement of the lever 26, and by limiting the movement of the lever with the stop 29, the maximum delivery pressure can be limited independently of the pressure at the inlet port 11.

Return of the lever 26 clockwise permits opening of the poppet 21 to vent the pressure fluid in the delivery port 13 to the return port. During the simultaneous retraction of the master pistons 46 and 47, fluid is drawn into the cylinder 36 past the check valve 69 from the return passage, and is drawn into the master cylinder 35 partially through the passage 40 and partially from the left end of cylinder 36 past the check valve 54 and the passages 53 in the piston head 48a.

When there is no pressure in the inlet port 11, the device functions as a master cylinder in the following manner: since there is no pressure in the passage 14, stop piston 30 is in its rightmost positon, permitting full travel of the lever 26, and the poppet 41 is closed, cutting off the passage 40 from the return port 12.

In response to the rightward movement of the master cylinder piston assembly 45 by the lever 26, the large piston 46 displaces fluid past the check valve 39 into the passage 40 and through it into the small cylinder 35. This fluid, together with that displaced by the small piston 47, is discharged past the check valve 38. Initially, the fluid passing the check valve 38 is vented through the passage 19b in the power valve piston 19 and past the poppet 21 of the power valve to return, until the lever 26 has traveled a short distance sufficient to close the poppet 21 on the left end of the valve piston 19. Thereafter, the fluid displaced by the master cylinders is discharged through the delivery port 13 and builds up pressure in the brake line. Although the power valve poppet 19a opens, the check valve 15 prevents escape of fluid through the port 11.

The entire volume displaced from both the small master cylinder 35 and the large master cylinder 36 is delivered through the delivery port 13 until the stepped piston 62, 63 moves away from the check ball 69. It will be noted that the pressure developed in the large master cylinder 36 is applied to the left end of the small piston 63, and the pressure developed in the small master cylinder 35 is applied to the annular left end of the large piston 62. These combined pressures, as they increase, move the stepped piston to the right until the check valve 69 is unseated by the stop rod 71, permitting venting of fluid from the large cylinder 36 to return. This venting is gradual for the following reasons.

While the ball 69 is seated, the pressure in the passage 73 is effective over the full diameter of the piston 63. When the ball touches the stop 71, only the annular end of the piston 63 is effective in response to the pressure in passage 73, and the pressure continues to rise until the combined pressure force on the annular ends of the piston 63 and piston 62 is sufficient to overcome the spring 68 and move the piston away from the ball 69 sufficiently to exhaust fluid at a rate to prevent any further rise in pressure in cylinder 36. However, the pressure in the small master cylinder 35 (and the delivery port 13) continues to rise, because the check valve 39 has closed, and this rising pressure applies an increasing force to the piston 62 so that a decreasing pressure on the piston 63 suffices to keep the ball valve 69 off its seat, and therefore the pressure in the large cylinder 36 gradually decreases as the pressure in the small master cylinder and the delivery port increases. Before maximum brake pressure is achieved, the pressure on piston 62 alone is sufficient to keep the valve ball 69 open, and the pressure in the large master cylinder 36 is substantially the return pressure. This arrangement prevents sudden changes in the reaction force on the piston 46 and eventually reduces the reaction force on it to substantially zero, so that a given pedal force produces a higher force on the smaller master piston 47 than it would if the pressure produced by the small piston was not applied to the piston 62, and the valve 69 opened only in response to pressure on the piston 63.

In the event that a single stroke of the master piston is insufficient to charge the brake system connected to the delivery port 13, additional fluid can be delivered by "pumping"; that is, partially retracting the lever 26 (insufficiently to open the power valve return poppet 21) and again advancing it. During retraction of the master pistons, the check valve 38 blocks return flow of fluid from the delivery port 13, and the only return flow is that into the reaction cylinder 37 (as its reaction piston 48 retracts) and into the power valve chamber 18 as the power valve piston retracts. The amount of fluid displaced in this way is relatively small. Fresh fluid enters the large master cylinder 36 from the return port 12 through passage 67, past the ball check valve 69 and the passage 73. Fluid enters the small master cylinder 35 past the check valve 54 from the left end of the large cylinder 36. Each time the lever 26 is again advanced, additional fluid is delivered from cylinders 35 and 36 to the delivery port 13, in the manner previously described, until the brake line is charged, and the pressure is built up to the desired value.

Although the amount of fluid displaced by the reaction piston 48 is small as compared to that displaced by the small master piston 35, it is sufficient to enable the operator, during manual operation, to appreciably reduce the pressure in the delivery port 13 by retracting the lever 26. This gives the operator good control of the brake pressure applied. Without the reaction piston 48, the operator could materially reduce the braking force only by fully retracting the lever 26 to the point where the power valve poppet 21 opened off its seat and released the brake pressure. Any reduction of the brake pressure in the line by retraction of the reaction piston entails no loss of fluid to the return line, so that when the reaction piston 48 is again advanced, the original pressure can be attained.

During manual operation, it is desirable that the stop piston 30 remains in its right end position to fully retract the stop 29 and permit full-stroke operation of the lever 26. However, the pressure developed by manual operation in the delivery port 13 is applied past the open valve poppet 19a to the passage 14 and to the right end of the stop piston 30, and this pressure, if unopposed, might eject the stop 29 to limit the stroke. However, such action is prevented by application of the pressure developed in the small master cylinder 35 through the passage 75 to the left side of the piston 30. The pressure on the left side, in conjunction with the force exerted by the spring 31, is sufficient to prevent ejection of the stop 29 during manual operation.

The operation of the unit has been discussed under two conditions: (1) when full power pressure is available in the port 11 and (2) when no power pressure is available in the port 11. In many cases, partial pressure is available in the port 11. Such partial pressure will insufficient to overcome the spring 42 urging the poppet 41 closed, and further increase of pressure in the port 13 and the passage 14, due to manual operation, cannot open the poppet 41 because the additional manual pressure is applied through the passage 40 to the right end of the poppet 41. Also, whenever the pressure existent in the pressure port 11 is insufficient to produce the desired brake pressure, the pressure developed in the small master cylinder 35 will equal the pressure in the passage 14 so that the spring 31 can maintain the stop 29 fully retracted.

Summarizing the advantages of the invention as described:

The coupling of the power valve to the lever 26 close to the fulcrum point and the coupling of the master cylinder piston to the lever at a point remote from the fulcrum point enables the use of a short-stroke power valve with a long-stroke master piston for large displacement during manual operation.

The long-stroke reaction piston 48 movable with the master piston assembly provides a desirable reaction force and enables the use of a small area power valve.

The connection of the master cylinder to the delivery port through a check valve enables pumping when necessary, and the long-stroke reaction piston 48 enables the modulation of the brake pressure during manual operation despite the check valve connection between the master cylinder and delivery port.

The stepped piston comprising the small piston 63 and the large piston 62 separately responsive to the pressures in the large master cylinder and the small master cylinder, respectively, provides smooth, gradual reduction of pressure in the large master cylinder to unload it and permit full pedal force to be applied to the small master piston at high pressures.

The application of pressure fluid from the master cylinder to the rear surface of the stop piston 30 enables retraction of the stop and full-stroke operation of the master pistons with the use of a relatively light, high-rate spring 31.

Although for the purpose of explaining the invention a particular embodiment thereof has been shown and described, obvious modifications will occur to a person skilled in the art, and I do not desire to be limited to the exact details shown and described.

I claim:

1. In hydraulic brake apparatus of the type described: a body defining a delivery port, a return port, a power pressure passage, a power valve cylinder, and a reaction cylinder laterally spaced from the power valve cylinder and connected to said delivery port whereby reaction pressure in said delivery port is applied to said reaction cylinder; power valve means including a valve piston in said valve cylinder for transferring said delivery port from connection to said return port in a retracted position of said valve means to connection to said power pressure passage in an advanced position of said valve means; a reaction piston in said reaction cylinder and extending therefrom and subject to said reaction pressure; and a manual lever fulcrumed on said body for simultaneously advancing said power valve means and said reaction piston, said valve means being connected to said lever closer to said fulcrum than is said reaction piston whereby greater motion is imparted to said reaction piston than to said valve means in response to movement of said lever, and the resistance to manual movement of said lever produced by said reaction pressure is increased.

2. Apparatus according to claim 1 in which said body defines a master cylinder coaxial with said reaction cylinder, and a master piston connected to for movement with said reaction piston and having larger displacement than said reaction piston; check valve means for enabling fluid flow from said master cylinder to said delivery port and preventing return flow; and valve means responsive to pressure in said power pressure passage exceeding a predetermined value to connect said master cylinder to said return port.

3. In hydraulic brake apparatus of the type described: a body defining a delivery port, a return port, a power pressure passage, a power valve cylinder, and a master cylinder laterally spaced from the power valve cylinder; power valve means including a valve piston in said valve cylinder for transferring said delivery port from connection to said return port in a retracted position of said power valve means to connection to said power pressure passage in an advance position of said power valve means; a master piston in said master cylinder and extending therefrom; a manual lever fulcrumed on said body for simultaneously advancing said power valve means and said master piston, said power valve means being connected to said lever closer to said fulcrum than is said master piston whereby greater motion is imparted to said master piston than to said power valve means in response to movement of said lever; check valve means for enabling fluid flow from said master cylinder to said delivery port and preventing return flow; and valve means responsive to pressure in said power pressure passage exceeding a predetermined value to connect said master cylinder to said return port.

4. In hydraulic brake apparatus of the type described: a body defining a delivery port, a return port, a power pressure passage, a power valve cylinder, and a master cylinder laterally spaced from the power valve cylinder; means including a check valve for supplying power fluid to said pressure chamber while preventing return flow; power valve means including a valve piston in said valve cylinder and reciprocable actuating means aligned with said piston for transferring said delivery port from connection to said return port in a retracted position of said actuating means to connection to said power pressure chamber in an advanced position of said actuating means; a master piston in said master cylinder and extending therefrom; a manual lever fulcrumed on said body for simultaneously advancing said power valve actuating means and said master piston, said actuating means being connected to said lever closer to said fulcrum than is said master piston whereby greater motion is imparted to said master piston than to said valve-actuating means; check valve means for enabling fluid flow from said master cylinder to said delivery port and preventing return flow; valve means responsive to pressure in said power pressure passage exceeding a predetermined value to connect said master cylinder to said return port; a stop cylinder in said body; a stop piston in said cylinder; a stop rod projecting from said piston into the path of said lever for variably limiting the travel of said lever according to the position of said stop piston in its cylinder; a fluid connection from said power pressure passage to such side of said stop piston as to reduce the lever travel; and a connection from said master cylinder to the other side of said piston to oppose the force thereon of pressure in said pressure chamber.

5. Apparatus according to claim 4 including spring means for urging said stop piston in direction to increase the travel of said lever.

6. Apparatus according to claim 4 in which said master cylinder is connected to the piston rod side of said stop piston.

No references cited.